Oct. 30, 1934.     O. N. GREDELL     1,978,457
HOSE CARRIER FOR TRUCK TANKS
Filed Oct. 26, 1931
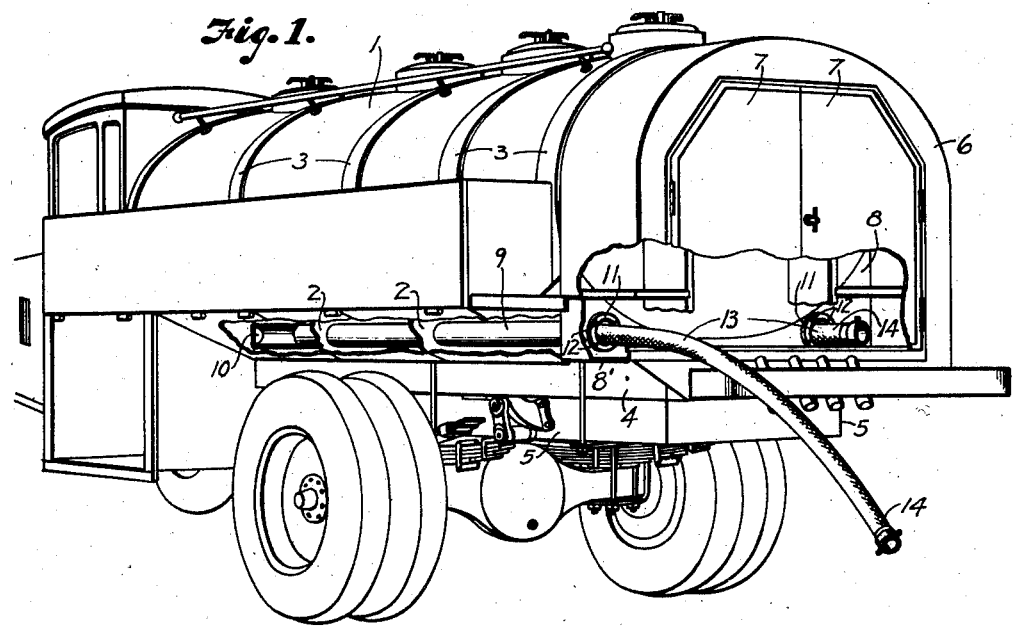
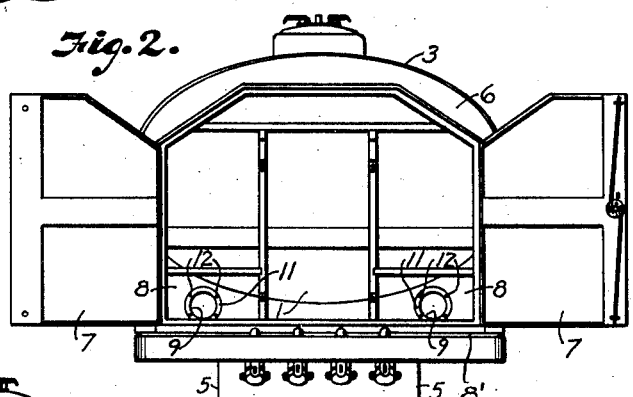
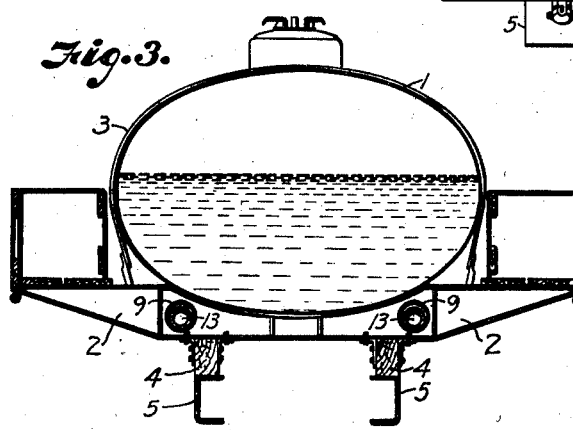
INVENTOR.
Otto N. Gredell
BY
ATTORNEY.

Patented Oct. 30, 1934

1,978,457

UNITED STATES PATENT OFFICE 1,978,457

HOSE CARRIER FOR TRUCK TANKS

Otto N. Gredell, Kansas City, Mo., assignor to Standard Steel Works, North Kansas City, Mo., a corporation of Missouri Application October 26, 1931, Serial No. 571,002

1 Claim. (Cl. 280—5)

This invention relates to hose carriers for truck tanks, and has for its principal object to provide a carrier which is so arranged that a hose may be enclosed therein.

At present, hose which are used for filling the service tanks are carried on the outside where they can be readily stolen if the tank is left unattended. The couplings, being almost universally of brass, are attractive to a certain class of thieves who do not hesitate to cut them from the hose at the least opportunity that presents itself, and, in so doing, ruin the hose. Again, with the present manner of carrying the hose, foreign matter such as dust and the like can readily lodge in the hose where it will be washed into the service tank with the liquid from the truck tank.

Therefore, other important objects of this invention are to fully protect the hose against theft, mutilation and the gathering of foreign matter therein.

An important feature in the preferred form of my invention is that when the doors are closed the hose may be said to be in a sealed container, since the hose can only be reached when the doors of the rear compartment are open.

In accomplishing these and other objects of my invention, I have provided improved details of structure, the preferred form of which is shown in the accompanying drawing, wherein:

Fig. 1 is a perspective view of a tank truck with parts broken away and in section, showing the hose carriers in position.

Fig. 2 is a rear view of the tank with the doors of the rear compartment open.

Fig. 3 is a vertical cross section of the tank, showing the location of the hose carriers.

Fig. 4 is an enlarged fragmental view with a part in section of one of the hose carriers, showing both ends thereof.

Referring to the drawing in detail:

1 represents the tank of a tank truck or wagon, and is of the ordinary construction. The tank 1 is secured to bolsters 2 by bands 3. The bolsters are in turn secured to sills 4, in any suitable manner, and the sills in turn are secured to side members 5 which form part of the chassis or body frame.

Located at the rear of the tank 1 is a compartment 6, access to which is had by means of doors 7 located in its rear wall, and which may be equipped with a suitable lock so as to prevent unauthorized opening. The compartment is also provided with a bottom wall 8' located in substantial alignment with the bottom faces of the bolsters 2 and provided with a wall 8 which, together with the rear end of the tank, closes the compartment 6.

Formed through the wall 8 at a point above the bottom 8' and in the bolsters 2 are axially aligned openings through which an elongated hollow member 9 extends. This member serves as the hose carrier and is of such size that the hose can be readily inserted, and may be of any cross-sectional shape desired although a circular shape is desirable because the openings for its reception can be more readily made if they are circular.

The forward end of the carrier is closed in any suitable manner as, for instance, a disk 10, as shown in Fig. 4, which is welded or otherwise secured to the end of the carrier; a cap or a plug suitably secured may also be used for this purpose, as it is desirable that this end of the carrier be substantially hermetically closed against protrusion of the hose or the entrance of foreign matter. The closing of this end of the carrier also prevents any tampering with an adjacent hose end which would be possible if the end were left open.

The rear end of the carrier is provided with a flange 11 which abuts the wall 8 and which is secured to the wall in any suitable manner as by rivets 12, or by means of bolts or welding.

The carrier is preferably made of such a length that when a hose section 13 is inserted therein and contacts the closure of the carrier, a portion 14 will extend into the rear compartment 6 where it is readily accessible, which would not be the case if the carrier were longer than the hose section.

While I have described only one carrier and its manner of installation, it is my intention to have identical carriers extend along both sides of the truck.

The carriers may be tack welded to the bolsters to prevent vibration and rattling, while the vehicle is in motion, but this will not be necessary if a snug fit is made.

What I claim and desire to secure by Letters Patent is:

In a hose carrier, the combination with a tank supported on bolsters and having a closed compartment at an end of the tank having a bottom extending in substantial alignment with the bottoms of the bolsters and provided with doors, a tubular member passed through and supported by said bolsters and communicating at one end with said compartment at a point above said bottom whereby the compartment excludes unauthorized access to a hose carried in said member when the doors are closed.

OTTO N. GREDELL.